(12) United States Patent
Ruthstein et al.

(10) Patent No.: US 10,462,060 B2
(45) Date of Patent: Oct. 29, 2019

(54) ABILITY TO DETECT UNLIMITED ELEPHANT FLOWS

(71) Applicant: Mellanox Technologies, Ltd., Yokneam (IL)

(72) Inventors: Jacob Ruthstein, Mazor (IL); David Mozes, Yokneam Moshava (IL); Dror Bohrer, Nesher (IL); Ariel Shahar, Jerusalem (IL); Lior Narkis, Petach-Tikva (IL); Noam Bloch, Bat Shlomo (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 15/896,128

(22) Filed: Feb. 14, 2018

(65) Prior Publication Data

US 2019/0253362 A1    Aug. 15, 2019

(51) Int. Cl.
*H04L 12/851* (2013.01)
*H04L 12/26* (2006.01)
*H04L 12/801* (2013.01)

(52) U.S. Cl.
CPC ........ *H04L 47/2441* (2013.01); *H04L 43/026* (2013.01); *H04L 43/062* (2013.01); *H04L 47/11* (2013.01); *H04L 47/2483* (2013.01)

(58) Field of Classification Search
CPC ..... H04L 43/026; H04L 43/062; H04L 43/08; H04L 47/11; H04L 47/2441; H04L 47/2483
See application file for complete search history.

(56) References Cited

U.S. PATENT DOCUMENTS

| | | | |
|---|---|---|---|
| 5,278,969 | A | 1/1994 | Pashan et al. |
| 5,541,912 | A | 7/1996 | Choudhury et al. |
| 6,570,403 | B2 | 5/2003 | Liu et al. |
| 7,688,734 | B2 | 3/2010 | Hellenthal et al. |
| 8,031,607 | B2 | 10/2011 | Rochon et al. |
| 8,588,070 | B2 | 11/2013 | Post |
| 9,124,515 | B2 | 9/2015 | Curtis et al. |
| 9,185,015 | B2 | 11/2015 | Matthews et al. |
| 9,548,924 | B2 | 1/2017 | Pettit et al. |
| 9,705,808 | B2 | 7/2017 | Arumilli et al. |
| 9,838,276 | B2 | 12/2017 | Pettit et al. |
| 9,967,199 | B2 | 5/2018 | Lambeth et al. |
| 10,158,538 | B2 | 12/2018 | Pettit et al. |
| 2002/0178311 | A1 | 11/2002 | Liu et al. |
| 2012/0131222 | A1 | 5/2012 | Curtis et al. |
| 2014/0237118 | A1 | 8/2014 | Matthews et al. |
| 2014/0337856 | A1 | 11/2014 | Lee et al. |

(Continued)

OTHER PUBLICATIONS

Shpiner et al., U.S. Appl. No. 15/844,658, filed Dec. 18, 2017.

(Continued)

*Primary Examiner* — Khoa Huynh
(74) *Attorney, Agent, or Firm* — Kligler & Associates

(57) ABSTRACT

Packet flows received in a data network are assigned to respective entries of a database. During an accumulation interval byte counts of the assigned packet flows are accumulated in the respective database entries. The packet flows are classified as elephant flows when differences between the byte counts and a reference byte count exceed a threshold and are reported after expiration of the accumulation interval.

13 Claims, 4 Drawing Sheets

(56) References Cited

U.S. PATENT DOCUMENTS

| | | | |
|---|---|---|---|
| 2015/0071072 A1* | 3/2015 | Ratzin | H04L 47/11 370/235 |
| 2015/0124825 A1 | 5/2015 | Dharmapurikar et al. | |
| 2015/0163117 A1* | 6/2015 | Lambeth | H04L 47/2441 709/224 |
| 2015/0163144 A1 | 6/2015 | Koponen et al. | |
| 2015/0163145 A1 | 6/2015 | Pettit et al. | |
| 2015/0271081 A1 | 9/2015 | Newman et al. | |
| 2015/0341247 A1 | 11/2015 | Curtis et al. | |
| 2016/0036733 A1 | 2/2016 | Srinivasan | |
| 2016/0105343 A1 | 4/2016 | Janarthanan et al. | |
| 2016/0301632 A1 | 10/2016 | Anand et al. | |
| 2016/0380895 A1 | 12/2016 | Xiong et al. | |
| 2017/0118090 A1 | 4/2017 | Pettit et al. | |
| 2017/0195240 A1 | 7/2017 | Chen et al. | |
| 2018/0241677 A1 | 8/2018 | Srebro et al. | |
| 2018/0331961 A1 | 11/2018 | Lambeth et al. | |

OTHER PUBLICATIONS

Network Heresy, "Of Mice and Elephants", Network Virtualization and the End-to-End Principle, 2 pages, Nov. 1, 2013 l.

Cheng et al., "Isolating Mice and Elephant in Data Centers", 14 pages, Jun. 1, 2016.

Mori et al., "Identifying Elephant Flows Through Periodically Sampled Packets", IMC Proceedings of the 4th ACM SIGCOMM Conference on Internet measurement, pp. 115-120, Oct. 25-27, 2004.

Amante et al., "IPv6 Flow Label Specification", Request for Comments 6437, 15 pages, Nov. 2011.

Liu et al., "An Adaptive Approach for Elephant Flow Detection With the Rapidly Changing Traffic in Data Center Network", International Journal of Network Management (e1987), pp. 1-13, year 2017.

U.S. Appl. No. 15/844,658 office action dated Dec. 31, 2018.

\* cited by examiner

ABILITY TO DETECT UNLIMITED ELEPHANT FLOWS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to transmission of digital information over a communications network. More particularly, this invention relates to characterization of traffic flows in a packet switched network.

2. Description of the Related Art

The meanings of certain acronyms and abbreviations used herein are given in Table 1.

TABLE 1

Acronyms and Abbreviations

| | |
|---|---|
| ACL | Access Control List |
| NIC | Network Interface Controller |
| QoS | Quality of Service |
| SRAM | Static Random Access Memory |

A packet switched network may process different types of flows, which can be characterized as elephant flows and mouse flows. An elephant flow represents a long-lived flow or a continuous traffic flow that is typically associated with a high-volume connection. A mouse flow represents a short-lived flow. Mice flows are often associated with bursty, latency-sensitive applications, whereas elephant flows tend to be associated with large data transfers in which throughput over a sustained period of time is more important than latency.

Elephant flows tend to fill network buffers, which produces queuing delay to anything that shares such buffers, in particular mouse flows. Mouse flows should generally receive high priority in order to comply with quality-of-service (QoS) requirements. Detection of elephant flows is useful, not only for discrimination from mouse flows, but also for load-balancing and for network analysis generally.

There are many proposals for identifying elephant flows. For example, U.S. Patent Application Publication No. 2015/0124825 proposes tracking data flows and identifying large-data flows by extracting fields from a packet of data to construct a flow key, computing a hash value on the flow key to provide a hashed flow signature, entering and/or comparing the hashed flow signature with entries in a flow hash table. Each hash table entry includes a byte count for a respective flow. When the byte count for a flow exceeds a threshold value, the flow is added to a large-data flow table and the flow is then tracked in the large-data flow table.

U.S. Patent Application Publication No. 2017/0118090 proposes a forwarding element that inspects the size of each of several packets in a data flow to determine whether the data flow is an elephant flow. When the forwarding element receives a packet in a data flow, the forwarding element identifies the size of the packet. The forwarding element then determines if the size of the packet is greater than a threshold size. If the size is greater, the forwarding element specifies that the packet's data flow is an elephant flow.

SUMMARY OF THE INVENTION

New flows are considered as elephant candidates. Flows which, for a certain time interval, have a rate higher than a reference rate for a given number of bytes, and more specifically higher than a predetermined elephant threshold value are detected and classified as elephant flows.

There is provided according to embodiments of the invention a method, which is carried out by receiving packet flows in a data network, assigning the packet flows to respective entries of a database, and during an accumulation interval accumulating in the database entries byte counts of the assigned packet flows thereof. The method is further carried out by accumulating a reference byte count during the accumulation interval and classifying the assigned packet flows as elephant flows when differences between the byte counts and the reference byte count exceed an elephant threshold, and reporting the elephant flows after expiration of the accumulation interval.

An aspect of the method includes classifying the assigned packet flows as mouse flows when differences between the reference byte count and the byte counts exceed a mouse threshold and assigning a lower priority to the elephant flows relative to the mouse flows in network interface controllers of the network.

A further aspect of the method is carried out by exempting the mouse flows from predefined congestion control procedures in the network interface controllers A further aspect of the method is carried out by removing the elephant flows from the database after reporting the elephant flows.

One aspect of the method includes classifying the assigned packet flows as mouse flows when differences between the reference byte count and the byte counts thereof exceed a mouse threshold, and after expiration of the accumulation interval removing the mouse flows from the database.

Yet another aspect of the method includes classifying the assigned packet flows as elephant candidate flows after expiration of the accumulation interval when they are classified neither as elephant flows nor as mouse flows.

Still another aspect of the method includes storing the elephant candidate flows in their respective database entries until a predetermined residence time limit is exceeded, thereafter classifying the elephant candidate flows as elephant flows or mice flows according to a predetermined policy, and removing the elephant candidate flows from the database.

There is further provided according to embodiments of the invention an apparatus, including a computing device connected to a network that receives flows of data packets via the network, and a memory storing the flows and a database. The computing device is configured for assigning the flows to respective database entries, and during an accumulation interval accumulating byte counts in the respective database entries. The computing device is configured for accumulating a reference byte count during the accumulation interval, and classifying the assigned flows as elephant flows when differences between the byte counts and the reference byte count exceed an elephant threshold, and reporting the elephant flows after expiration of the accumulation interval.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Definitions

According to RFC 6437, and as used herein, a flow (or data flow) is a sequence of packets sent from a particular source to a particular unicast, anycast, or multicast destination that the source desires to label as a flow. A flow could consist of all packets in a specific transport connection or a media stream.

System Overview.

Figure 1:
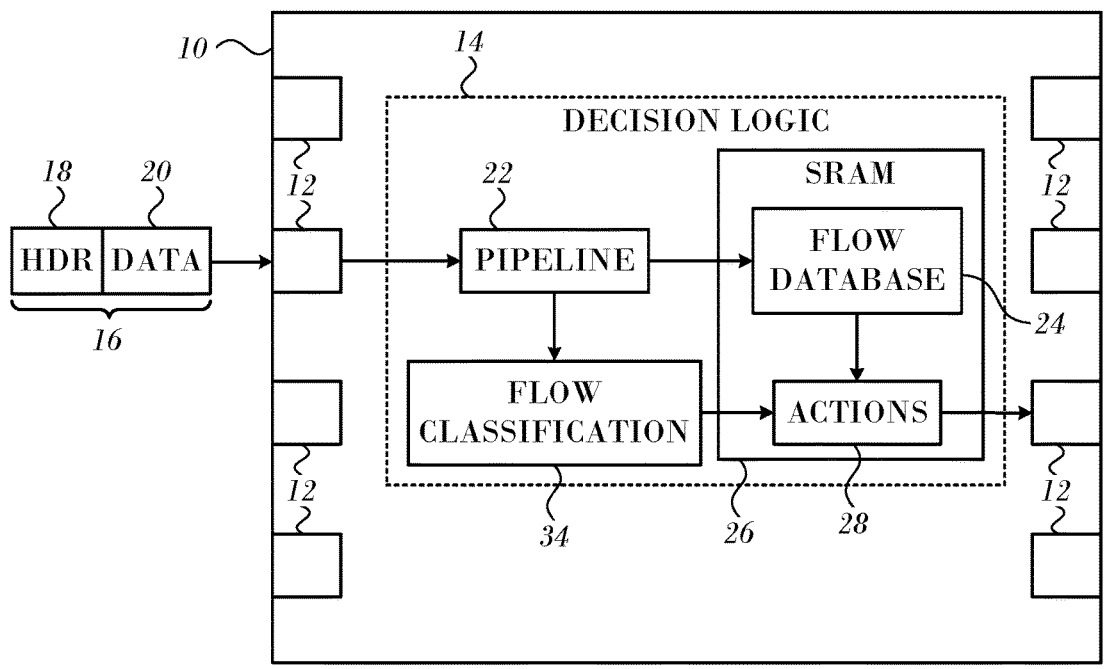
FIG. 1 is a block diagram of typical network element of a data network in accordance with an embodiment of the invention.

Turning now to the drawings, reference is now made to FIG. 1, which is a block diagram of typical network element 10, which transmits and receives packets in accordance with an embodiment of the invention. The element 10 can be configured as a network or fabric switch or a host channel adapter, for example, with multiple ports 12 connected to a packet communication network. Decision logic 14 applies flow classification rules in forwarding data packets 16 between ports 12, as well as performing other actions, such as encapsulation and decapsulation, security filtering, and/or quality-of-service functions. The circuitry needed for carrying out such forwarding and other functions will be apparent to those skilled in the art and is omitted from the figures for the sake of simplicity in order to concentrate on the actual classification functions of decision logic 14.

In the pictured embodiment, decision logic 14 receives packets 16, each containing a header 18 and payload data 20. A processing pipeline 22 in decision logic 14 extracts a classification key from each packet, typically (although not necessarily) including the contents of certain fields of header 18. For example, the key may comprise the source and destination addresses and ports and a protocol identifier. Pipeline 22 matches the key against a matching database 24, which is stored in an SRAM 26 in network element 10, as described in detail hereinbelow. SRAM 26 also contains a list of actions 28 to be performed when a key is found to match one of the database entries. For this purpose, each entry of the database 24 typically contains a pointer to the particular action that decision logic 14 is to apply to packets 16 in case of a match. Pipeline 22 typically comprises dedicated or programmable hardware logic, which is configured to carry out the functions described herein.

Hardware Classification.

Pipeline 22 is linked to a flow classification module 34, which is an array of hardware-implemented classification units. Inputs to the module 34 include the packet keys enabling identification of flows, and the state of the flows. The module 34 is used to enable discrimination between elephant and mice flows. Details are provided in the discussion below.

Figure 2:
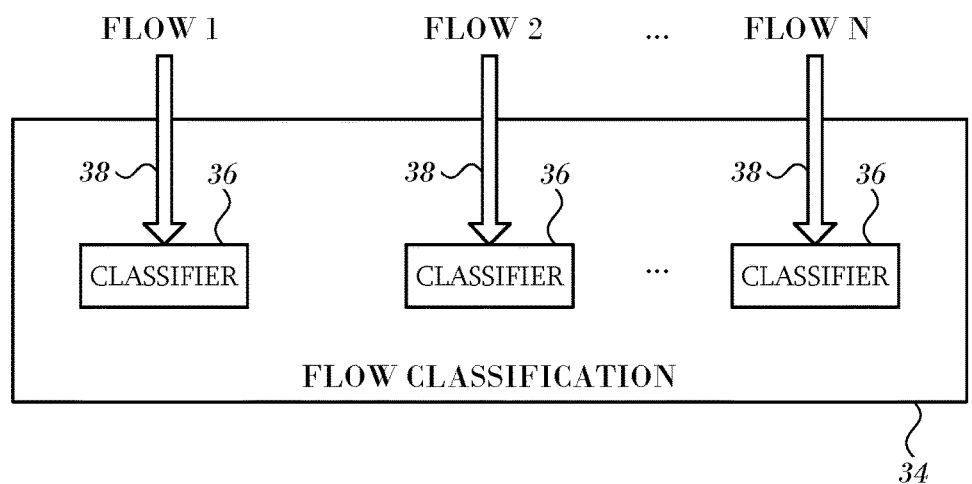
FIG. 2 is a block diagram of a flow classifier in accordance with an embodiment of the invention.

Reference is now made to FIG. 2, which is a block diagram of the module 34, in accordance with an embodiment of the invention. Packets identified in the decision logic 14 by reference to the database 24 as members of particular flows are distributed to instances of flow classifier 36, as indicated by arrows 38. The number of flow classifiers in module 34 is system dependent. In a current version 128 database entries are provided for identification and tracking of elephant flows. After a specified interval, the database is purged, so that in during the next interval, up to 128 new elephant flows can be identified.

Figure 3:
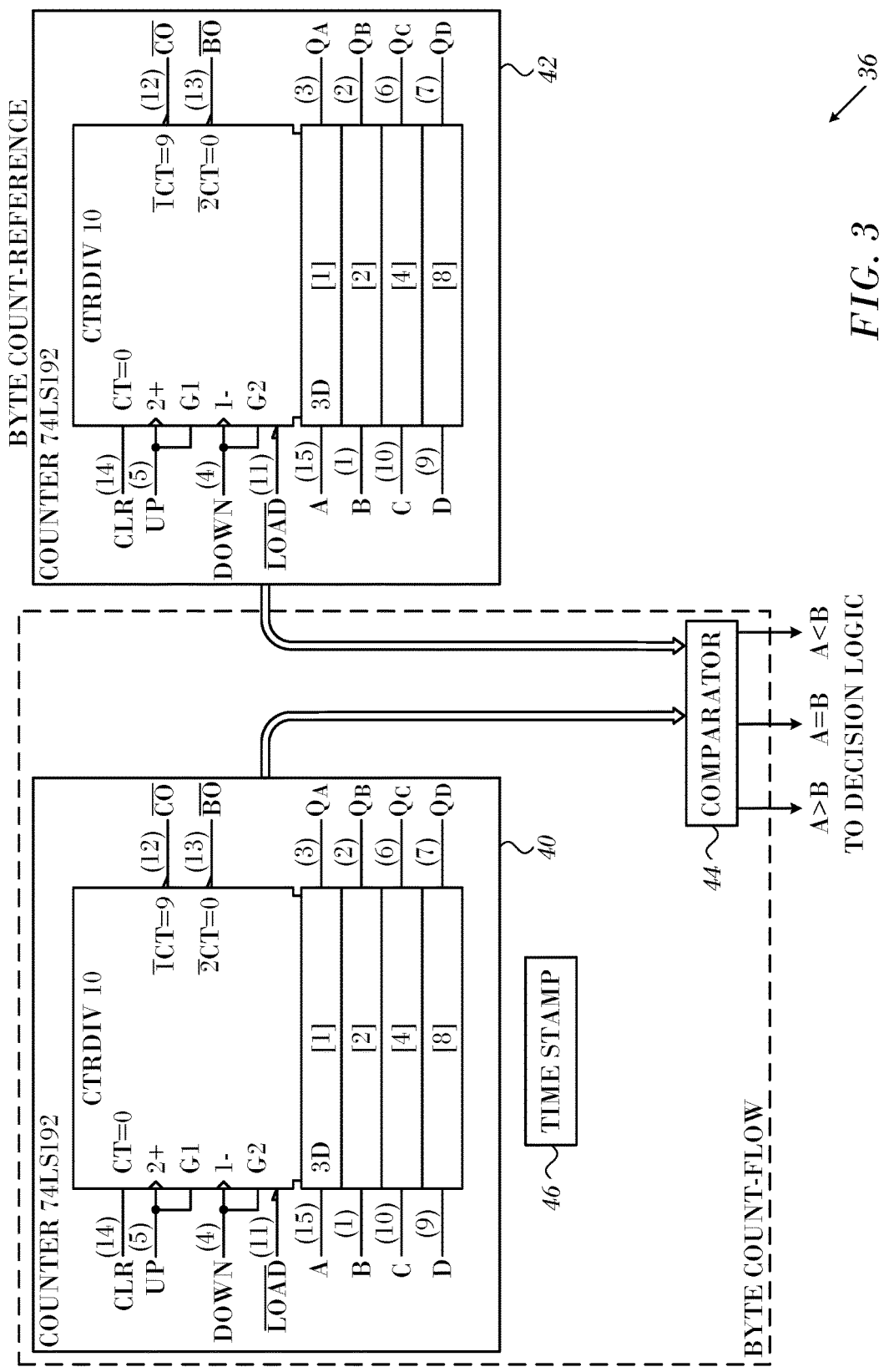
FIG. 3 is a detailed block diagram of the flow classifier shown in FIG. 2 in accordance with an embodiment of the invention.

Reference is now made to FIG. 3, which is a detailed block diagram of the flow classifier 36 in accordance with an embodiment of the invention. Byte counts of the flow packets are accumulated in counter 40. A reference counter 42, counts at a predetermined rate. From time to time the outputs of the counters 40, 42 are input into a comparator 44. Outputs of the comparator indicate the relative magnitudes of the counters 40, 42. The outputs are fed to decision logic 14 (FIG. 1) where the flow is classified, using the algorithm described below. A memory 46 holds a time stamp, which is set upon assignment of the flow classifier 36 as a database entry for a newly identified flow. The time stamp is used for determining that the flow stayed too long in the database and it has not been decided whether it is an elephant or mouse flow, as explained in the discussion of FIG. 6 below.

Detection Algorithm.

Newly identified flows are considered as elephant flow candidates. A flow is characterized according to its byte count accumulated over a predefined interval and compared to a reference byte count (counter 42).

$$BC = BR_{Ave} * T_{ref},  \quad \text{Eq. (1)}$$

where BC is the accumulated byte count; $BR_{Ave}$ is the average byte rate, and $T_{ref}$ is the time interval over which the byte count is accumulated. A suitable choice of the interval $T_{ref}$ allows accurate discrimination of an elephant flow from a bursty, relatively short-lived mouse flow. The value of the interval $T_{ref}$ can change according to the reference bandwidth of elephant flows. In the embodiment of FIG. 3, the byte count of a candidate flow $C_i$ in counter 40 is measured against a reference counter value $C_r$ in counter 42. Counter 42 is a free running counter that is periodically incremented based on a configurable reference rate.

The byte count of a flow is updated by accumulating the number of bytes of the received packet. Each flow is evaluated synchronously or asynchronously, e.g., in background, using the procedures of FIG. 5 and FIG. 6 described below. As part of flow management, a zero-byte packet for each flow is created in order to check the state of the flow. This enables identification of flows in which packets are no longer arriving. Such flows are purged from the database.

Figure 4:
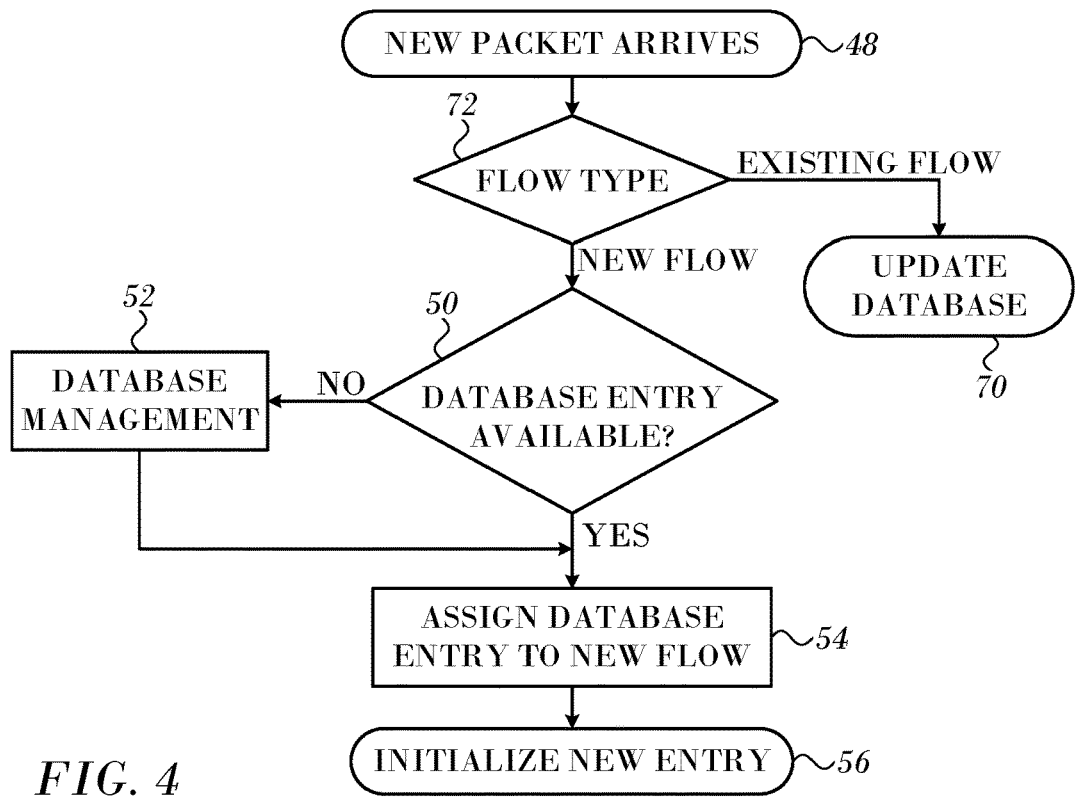
FIG. 4 is a flow chart of a method for detection of elephant flows in accordance with an embodiment of the invention.

Reference is now made to FIG. 4, which is a flow chart of a method for monitoring elephant flows in a network element in accordance with an embodiment of the invention. The process steps are shown in a particular linear sequence for clarity of presentation. However, it will be evident that many of them can be performed in parallel, asynchronously, or in different orders. For example, while FIG. 4 focuses on a single flow classifier 36, many instances of the flow classifier 36 can be processed concurrently using the same scheme. Those skilled in the art will also appreciate that a process could alternatively be represented as a number of interrelated states or events, e.g., in a state diagram. Moreover, not all illustrated process steps may be required to implement the method. The preceding figures exemplify the method; however, the method is not limited to the particular embodiments shown.

At initial step 48 a new packet arrives (or is originated) in the network element. Then at decision step 72 it is determined if the new packet belongs to a previously recognized flow, or to a new flow, i.e., a flow not presently entered in the flow database 24. Typically, the flow database is searched based on some packet key that defines a flow, such as information in the header.

If the packet belongs to a flow that is not found in the flow database, then a flow recognition procedure begins at decision step 50, where it is determined if an empty place is available in the flow database. If the determination at decision step 50 is negative, i.e., the database is full, then control proceeds to step 52, which in which a database management procedure is carried out. An existing entry in the database is purged, based on a governing policy. For example, a mouse flow having the smallest current byte count might be chosen to be eliminated from the database.

After performing step 52 or if the determination at decision step 50 is affirmative, then an available entry is established for the new flow in step 54.

Next, at final step 56 the flow classifier 36 of the cache entry determined in step 54 is initialized. The value of the counter 40 ($C_i$) is assigned the current value of the reference counter 42 ($C_r$). The timestamp in memory 46 is set to the current time.

A database entry has one of the states shown in Table 2, referable to two threshold values: elephant threshold (ET) and mouse threshold (MT):

TABLE 2

| | |
|---|---|
| Elephant | $C_i - C_r \geq ET$; |
| Elephant Candidate | $-MT < C_i - C_r < ET$; and |
| Mouse | $C_r - C_i \geq -MT$ |

It will be apparent that in a mouse flow the byte count is less than the reference count, and in an elephant flow the byte count exceeds the reference count, under the assumption that elephant flows persist for a long time relative to mouse flows. All new flows are treated as elephant candidates, and state variables (e.g., the byte count and the timestamp) maintained in the flow classifier 36 are initialized accordingly. The byte count of the current packet may be included as part of the initialization.

If in decision step 72 it was determined that the flow was already known to the flow database, then at final step 70 the byte count of the current packet is updated in the flow database.

Figure 5:
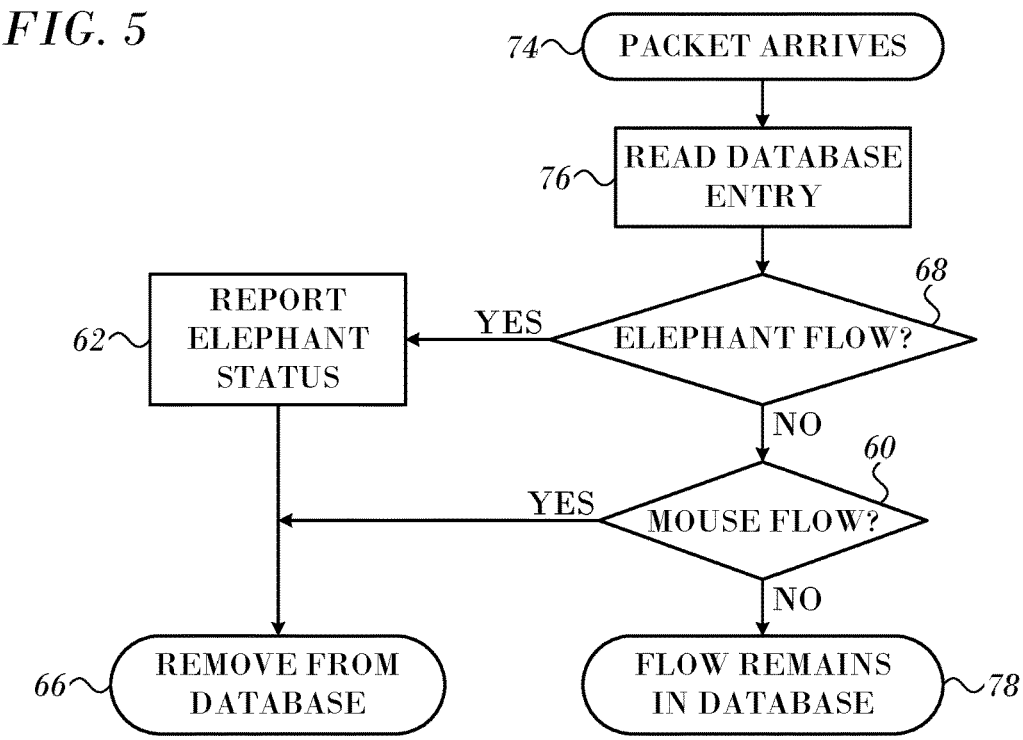
FIG. 5 is a flow chart of a method for flow monitoring in accordance with an embodiment of the invention.

Reference is now made to FIG. 5, which is a flow chart of a method for flow classification in accordance with an embodiment of the invention. The procedure may be executed asynchronously or in coordination with the procedure described above with respect to FIG. 4. For simplicity the process is illustrated with respect to one flow. However, it may be executed in concurrent threads or as multiple instances implemented in hardware in order to process many flows efficiently.

As noted above, it is important to filter out short bursts of activity in mouse flows that would produce large bye counts in a short time interval. A minimum accumulation interval is necessary to obtain a more accurate reading of the byte rate of such flows. At initial step 74 a packet arrives. A clock is read, for example a system clock, or the counter 42 (FIG. 3) is read.

Next, the state variables in the database entry for the flow are read at step 76. The number of bytes that have been accumulated in the flow database may be checked (the byte count) and compared to the reference counter (counters 40, 42, FIG. 3).

Next, in decision step 68 it is determined from the database reading if the flow can be classified as an elephant flow. This is calculated based on the comparison of $C_i - C_r >= ET$. The determination is based on the state values (Byte count Ci) recorded in the database, which are updated according to the above-noted inequalities when new packets arrive, and compared to the reference thresholds Cr and ET.

If the determination in decision step 68 is affirmative, the flow is reported in step 62 as an elephant flow and treated accordingly by the policy of the network element. For example, in a NIC a QoS requirement may assign lower priority in queues to elephant flows than to mouse flows. In another example, congestion control procedures may disfavor elephant flows. Mouse flows may be exempted from the congestion control procedures. In a network switch access control lists (ACL) may be configured to reflect different treatments for elephant and mouse flows. The flow is removed from the database in final step 66.

If the determination at decision step 68 is negative, then in decision step 60 it is determined from the database reading in step 76 if the current flow is a mouse flow. If so then the flow is removed from the cache at final step 66

If the determination at decision step 60 is negative, then it is concluded that the current flow is an elephant candidate, as it neither meets the criteria for an elephant flow nor for a mouse flow. The flow is allowed to remain in the database, and the procedure ends at final step 78.

In some embodiments a crawler intermittently or continually scans the database, by generating a zero-byte packet for each one of the flows in the database, one flow at a time, and updates the state variables according to the above-noted inequalities. This crawler may operate asynchronously. Optionally, mouse flows identified in the database by the crawler may be removed from further consideration by purging the mouse flows from the database without waiting for the current accumulation interval to expire. In this way entries in the database are available for reassignment to new flows.

Alternate Embodiment

Figure 6:
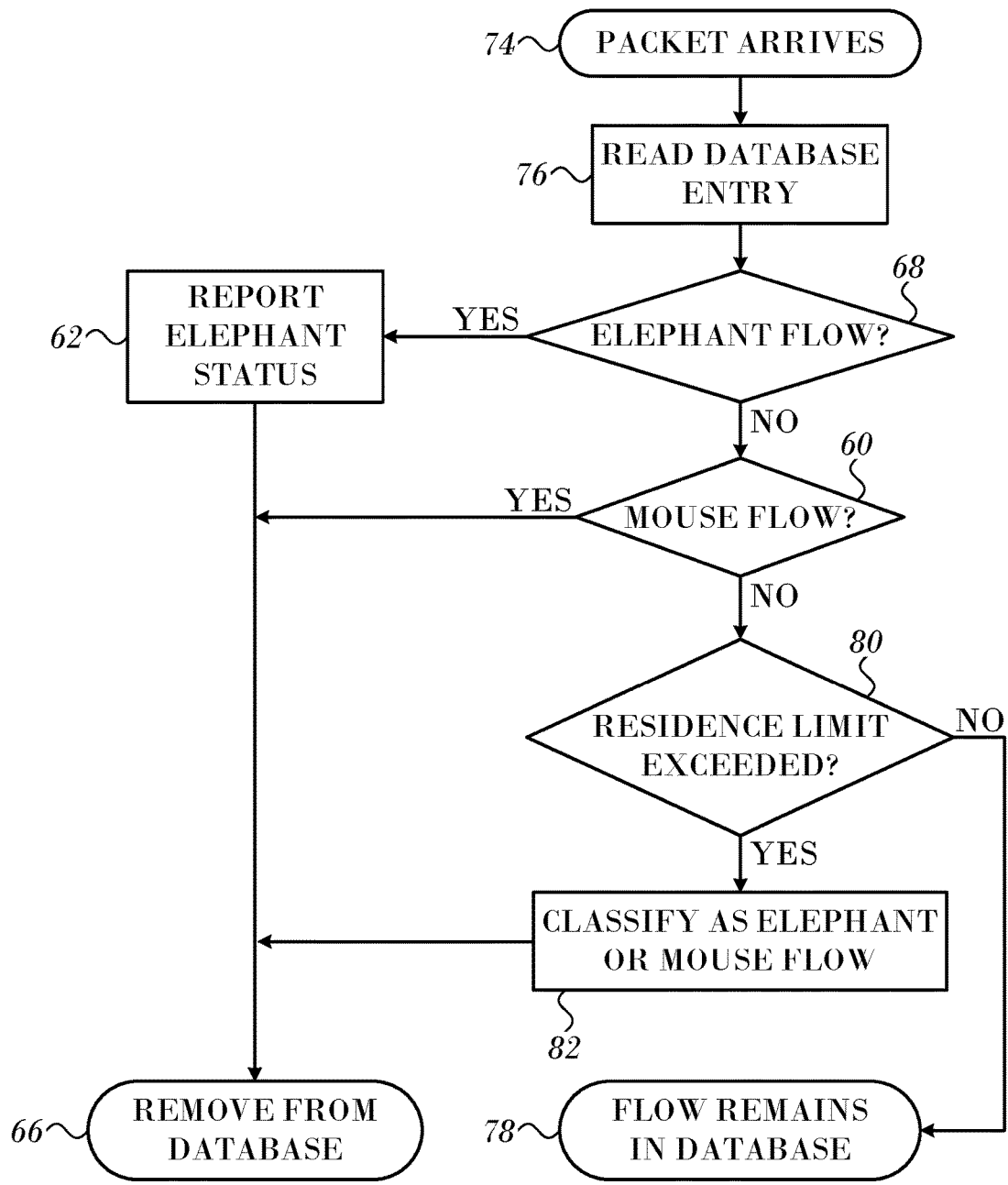
FIG. 6 is a flow chart of a method for flow monitoring in accordance with an alternate embodiment of the invention.

Reference is now made to FIG. 6, which is a flow chart of a method for flow classification in accordance with an alternate embodiment of the invention. This is similar to the previous embodiment, except that additional steps are performed if at decision step 60 it is determined that the flow is an elephant candidate. Such flows are allowed to reside in the database only for a predetermined time, after which they are purged. This prevents the database from becoming clogged by flows that never meet criteria for an elephant flow nor a mouse flow.

At decision step 80, it is determined from the database reading in step 76 if the allowed residence time for the flow has been exceeded. If the determination at decision step 80 is negative, then control proceeds directly to final step 78 and the flow remains in the database as in the previous embodiment.

If the determination at decision step 80 is affirmative, then control proceeds to step 82. The flow is classified either as a mouse flow or an elephant flow according to a predetermined policy. The flow is then deleted in final step 66. Optionally, for future iterations, the interval defined by the values −MT and ET in Table 2 can be narrowed when applied to the current flow to prevent the classification from easily returning to elephant candidate status. Should even this leniency be violated, the flow can then be deleted following a subsequent iteration of decision step 80.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method, comprising the steps of:
receiving packet flows in a data network;
assigning the packet flows to respective entries of a database having database entries;
during an accumulation interval accumulating in the database entries byte counts of the assigned packet flows thereof;
during the accumulation interval accumulating a reference byte count; and
classifying the assigned packet flows as elephant flows when differences between the byte counts and the reference byte count exceed an elephant threshold;
reporting the elephant flows after expiration of the accumulation interval;
classifying the assigned packet flows as mouse flows when differences between the reference byte count and the byte counts thereof exceed a mouse threshold; and
after expiration of the accumulation interval removing the mouse flows from the database;
classifying the assigned packet flows as elephant candidate flows when they are classified neither as elephant flows nor as mouse flows;
storing the elephant candidate flows in their respective database entries until a predetermined residence time limit is exceeded;
thereafter classifying the elephant candidate flows as elephant flows or mice flows according to a predetermined policy; and
removing the elephant candidate flows from the database.

2. The method according to claim 1, wherein the data network comprises network interface controllers, further comprising the steps of:
classifying the assigned packet flows as mouse flows when differences between the reference byte count and the byte counts exceed the mouse threshold; and
assigning a lower priority to the elephant flows relative to the mouse flows in the network interface controllers.

3. The method according to claim 2, further comprising exempting the mouse flows from predefined congestion control procedures in the network interface controllers.

4. The method according to claim 1, further comprising the step of:
after reporting the elephant flows removing the elephant flows from the database.

5. An apparatus, comprising:
a computing device connected to a network and receiving flows of data packets via the network; and
a memory storing the flows, and storing a database having database entries, wherein the computing device is configured for:
assigning the flows to respective database entries;
during an accumulation interval accumulating in the database entries byte counts of the assigned flows thereof;
during the accumulation interval accumulating a reference byte count; and
classifying the assigned flows as elephant flows when differences between the byte counts and the reference byte count exceed an elephant threshold;
classifying the assigned flows as mouse flows when differences between the reference byte count and the byte counts thereof and exceed a mouse threshold;
classifying the assigned flows as elephant candidate flows when they are classified neither as elephant flows nor as mouse flows;
after expiration of the accumulation interval removing the mouse flows from their respective database entries;
reporting the elephant flows after expiration of the accumulation interval;
storing the elephant candidate flows in their respective database entries until a predetermined residence time limit is exceeded;
thereafter classifying the elephant candidate flows as elephant flows or mouse flows according to a predetermined policy; and
removing the elephant candidate flows from the database.

6. The apparatus according to claim 5 further comprising a network interface controller linked to the network and cooperative with the computing device, wherein the network interface controller is configured for:
classifying the assigned flows as mouse flows when differences between the reference byte count and the byte counts exceed the mouse threshold; and
assigning a lower priority to the elephant flows relative to the mouse flows.

7. The apparatus according to claim 6, wherein the network interface controller is configured for exempting the mouse flows from predefined congestion control procedures.

8. The apparatus according to claim 5, wherein the computing device is configured for:
after reporting the elephant flows removing the elephant flows from the database.

9. The apparatus according to claim 5, wherein the computing device is a host channel adapter.

10. The apparatus according to claim 5, wherein the computing device is a fabric switch.

11. A method, comprising the steps of:
receiving packet flows in a data network;
assigning the packet flows to respective entries of a database having database entries;
during accumulation intervals accumulating in the database entries byte counts of the assigned packet flows thereof;
during each of the accumulation intervals accumulating a reference byte count; and
classifying the assigned packet flows as elephant flows and as mouse flows when differences between the respective byte counts of the packet flows and a current reference byte count differ by at least respective elephant and mouse classification thresholds;
after expiration of the accumulation intervals removing the elephant flows and mouse flows from the database;
storing new packet flows as elephant candidate flows in respective database entries for a time period that does not exceed a predetermined residence time limit; and thereafter
  (a) classifying the elephant candidate flows as elephant flows or mouse flows according to a predetermined policy; and
  (b) removing the classified elephant candidate flows from the database.

12. The method according to claim 11, further comprising classifying the assigned packet flows as mouse flows when differences between the reference byte count and the byte counts thereof exceed a mouse threshold.

13. The method according to claim 11, further comprising classifying the assigned packet flows as elephant flows when differences between the byte counts and the reference byte count exceed an elephant threshold.

* * * * *